United States Patent
Sonner et al.

(10) Patent No.: US 8,620,474 B2
(45) Date of Patent: Dec. 31, 2013

(54) CONTROL DEVICE AND METHOD FOR A MANIPULATOR

(75) Inventors: Christian Sonner, Munich (DE); Uwe Zimmermann, Augsburg (DE)

(73) Assignee: Kuka Laboratories GmbH, Augsburg (DE)

( * ) Notice: Subject to any disclaimer, the term of this patent is extended or adjusted under 35 U.S.C. 154(b) by 610 days.

(21) Appl. No.: 12/695,198

(22) Filed: Jan. 28, 2010

(65) Prior Publication Data

US 2010/0198404 A1 Aug. 5, 2010

(30) Foreign Application Priority Data

Feb. 2, 2009 (DE) .......................... 10 2009 007 026

(51) Int. Cl.
*G05B 15/00* (2006.01)
*G05B 19/00* (2006.01)
*G05B 19/04* (2006.01)
*G05B 19/18* (2006.01)
*G05B 19/416* (2006.01)

(52) U.S. Cl.
USPC ........... 700/260; 700/252; 700/256; 700/262; 318/568.18; 901/9

(58) Field of Classification Search
USPC .................... 901/1–50; 700/245–269, 90; 318/568.1–568.25; 706/45–61
See application file for complete search history.

(56) References Cited

U.S. PATENT DOCUMENTS

| | | | |
|---|---|---|---|
| 4,453,211 A | | 6/1984 | Askinazi et al. |
| 4,453,221 A | * | 6/1984 | Davis et al. .................. 700/252 |
| 4,623,971 A | * | 11/1986 | Ailman et al. ............... 700/252 |
| 5,811,952 A | | 9/1998 | Kato et al. |
| 6,522,951 B2 | | 2/2003 | Born et al. |
| 2004/0074877 A1 | * | 4/2004 | Hochhalter et al. ........ 219/86.41 |
| 2005/0228365 A1 | * | 10/2005 | Wang et al. ...................... 606/1 |
| 2007/0161872 A1 | * | 7/2007 | Kelly et al. .................. 600/300 |
| 2010/0036526 A1 | * | 2/2010 | Eriksson ....................... 700/250 |
| 2010/0143089 A1 | * | 6/2010 | Hvass et al. .................. 414/754 |
| 2010/0204713 A1 | * | 8/2010 | Ruiz Morales ............... 606/130 |

FOREIGN PATENT DOCUMENTS

| | | |
|---|---|---|
| WO | 97/29890 | 8/1997 |
| WO | 2008/141730 | 11/2008 |

OTHER PUBLICATIONS

Schreiber et al. "Solving the Singularity Problem of non-redundant Manipulators by Constraint Optimization," Proceedings of the 1999 IEEE/RSJ International Conference on Intelligent Robots and Systems, pp. 1482-1488.
Park et al., "An Approach to Robot Motion Analysis and Planning for Conveyor Tracking," Proceedings of the 1999 IEEE International Conference on Robotics and Automation Sacramenton, California, Apr. 1991 pp. 70-75.

* cited by examiner

*Primary Examiner* — Khoi Tran
*Assistant Examiner* — Abby Lin
(74) *Attorney, Agent, or Firm* — Schiff Hardin LLP

(57) ABSTRACT

In a method for controlling a manipulator, in particular a robot, a reference path is stored and reference increments are automatically determined while following the path the reference increments are determined based on the dynamics of the manipulator while following the path.

12 Claims, 1 Drawing Sheet

CONTROL DEVICE AND METHOD FOR A MANIPULATOR

BACKGROUND OF THE INVENTION

1. Field of the Invention

The present invention refers to a method for controlling a manipulator, in particular a robot, of the type wherein a reference path is stored and reference increments are determined while following the path, and to a control device for a manipulator for performing such method.

2. Description of the Prior Art

In many applications a reference path of a manipulator is stored a priori offline, for example by teaching of positions which are to be reached successively by a manipulator-fixed reference coordinate system like the tool centre point ("TCP"). While executing a respective work program, an interpolating device then determines online reference increments for the single joints of the manipulator based on a stored path planned from said stored positions. The manipulator control aims to realize said reference increments in time increments determined by the path planning.

This is not always possible since for example joint drives cannot apply the necessary forces and torques. Thus, in present practice usually the path velocity is reduced by hand until torque limits and other limitations can be met. This so-called override method is mentioned for example in DE 199 59 330 A1.

SUMMARY OF THE INVENTION

It is an object of the present invention to improve the behavior of a manipulator when following a stored path.

The above object is achieved in accordance with the present invention by a method for controlling a manipulator, such as a robotic manipulator, wherein a reference path is stored and reference increments are automatically determined in a processor while following the path, and wherein the reference increments are determined based on dynamics of the manipulator while following the path. The processor emits a control signal, as an output from the processor, which controls movement of the manipulator with respect to the path, according to the aforementioned determinations.

As noted above, according to the present invention the dynamics of the manipulator is taken into account online while following the path. If the dynamics does not allow following the stored path exactly with a predetermined velocity, a deviation from the path can be made in a predetermined way and/or the path velocity can automatically be reduced in a predetermined way. Preferably this reaction is determined online by a multi-criteria optimization.

For this purpose at first a reference path is stored, for example as sequence of reference positions $$r_s = \{r_{s,1}, r_{s,2}, \ldots\} \quad (1)$$

or as parameterized functions, for example by spline polynomials of higher degree for the reference positions versus time t or a path parameter s:

$$r_s[s(t)] = \sum_{i=0}^{ } a_i \cdot t^i, \quad (2)$$

wherein a reference position preferably is defined in the Cartesian work space of the manipulator and may define the location of a manipulator-fixed reference coordinate system, in particular of the TCP, relative to the origin of a reference system, for example in Cartesian coordinates (x, y, z), and/or its orientation relative to such reference system, for example in EULER- or KARDAN-angles ($\alpha, \beta, \gamma$):

$$r_s[s(t)] = [x \; y \; z \; \alpha \; \beta \; \gamma]^T \quad (3)$$

A reference position can also be defined directly in joint coordinates $q = [q_1, \ldots q_a]^T$, which define the positions of joints of the manipulator, for example the angular positions of rotational joints of an articulated robot, wherein the Jacobian J gives the transformation between a positional change $\Delta r$ of a manipulator-fixed reference coordinate system and the change of the joint coordinates $\Delta q$:

$$\Delta r = J \cdot \Delta q \quad (4)$$

While following the path an interpolating device at a point of time t determines online reference increments, by which the actual position of the manipulator is to be changed in a time increment $\Delta t$ so as to follow the stored reference path. These reference increments can be determined in work space or, preferably, in joint coordinates, so that they may be used as reference values in a control for the joint drives:

$$\Delta q_s(t) \quad (5)$$

In the present application by generalization a feedforward and also a feedback control both are called a control, for example a PID single joint control or the like, to which the single $\Delta q_i(t)$ are given as reference joint angle updates.

The interpolating device can firstly determine a reference movement $\Delta r_s(t)$ for a time increment $\Delta t$, for example by interpolating between stored positions or by evaluating a stored function:

$$\Delta r_s(t) = r_s(t + \Delta t) - r(t) \quad (6)$$

Conventionally then from (4) and (6) the reference increments $\Delta q_s(t)$ are determined by solving the equation $$\Delta r_s(t) = J \cdot \Delta q_s(t) \quad (7)$$

However it may occur that such-determined reference increments $\Delta q_s(t)$ cannot be realized in the time increment $\Delta t$, since that for example may require too large forces and torques of the drives. Thus according to the present invention the reference increments are determined while following the path on basis and taking into account the dynamics of the manipulator, in particular a, preferably linearized, model of the manipulator.

The dynamics of a manipulator can be modelled by its equations of motion $$M \cdot \frac{d^2 q}{dt^2} + h\left(q, \frac{dq}{dt}\right) = \tau \quad (8)$$

with the mass matrix M, the n-th time derivative $d^n/dt^n$, the drive forces $\tau = [\tau_1, \ldots \tau_A]^T$ in the joints (in the present application also torques, for example of drive motors, are called forces), and the vector h embodying the weight forces, frictional forces, gyroscopic forces and the like. Generally each mathematical relation between positions, in particular joint coordinates, time derivatives thereof and drive forces is called a "model" in the meaning of the present invention, in particular relations stored in tabular form or as parameterized functions.

By linearizing or discretizing of the equations of motion and/or the time derivative, for example by:

$$\frac{dq}{dt} \approx \frac{\Delta q_s(t)}{\Delta t} \qquad (9.1)$$

$$\frac{d^2 q}{dt^2} \approx \frac{\frac{\Delta q_s(t)}{\Delta t} - \frac{dq}{dt}}{\Delta t} \qquad (9.2)$$

$$\tau = M \cdot \frac{d^2 q(t)}{dt^2} + h\left(q(t), \frac{dq(t)}{dt}\right) \approx \qquad (9.3)$$
$$M\left(\frac{\Delta q_s(t)}{\Delta t^2} - \frac{dq(t)/dt}{\Delta t}\right) + h\left(q(t), \frac{dq(t)}{dt}\right)$$

thus by evaluating the model of the manipulator it can be determined, whether the drive forces $\tau$ which are required to realized the reference increments $\Delta q_s(t)$, exceed given drive limits, for example by determining reference increments $\Delta q_s(t)$ according (7) and checking according to (9.1), (9.2) and (8) or (9.3) whether drive forces yielding from model (8) or (9.3) respectively are within a tolerable range:

$$\tau_{min} \leq \tau \leq \tau_{max} \qquad (10)$$

If this is not the case, in a preferred embodiment the reference increments are determined such that they deviate or differ from the reference motion in a predetermined or predefined way. To this purpose the reference increments can for example be determined as, in particular linear, transformation or mapping of the reference motion, for example by multiplying with a shortening or reducing factor:

$$(1-\theta) \cdot \Delta r_s(t) = J \cdot \Delta q_s(t) \qquad (11)$$

Thus the reference motion resulting from the interpolation or evaluation of the stored reference path at first is shortened or reduced until the required drive forces $\tau$, which yield from the dynamics of the manipulator taken into consideration, are within the tolerable range.

It is also possible to predetermine other deviations from the reference motion, in a preferred embodiment for example by determining a tube enclosing the reference motion, wherein the reference increments must be located within said tube. Then the reference motion yielding initially from the interpolation or the evaluation of the stored reference path, is varied within the predetermined tube until, for example, the required drive forces $\tau$ yielding from the dynamics of manipulator taken into account, are within the tolerable range. This also is a determination of the reference increments as a mapping, respectively a linear mapping, of the reference motion, wherein the mapping then describes the predetermined space of tolerable deviations, in particular a tube enclosing the reference motion:

$$\Delta r_s(t) \mapsto \Delta q_s(t) = \Phi(\Delta r_s(t)) \qquad (11a)$$

Parameterizing the mapping then allows to optimize it, i.e. to determine the deviations with respect to the reference motion such that the necessary drive forces $\tau$ yielding from the dynamics of the manipulator taken into account are within the tolerable range:

$$\Phi = \Phi(\theta) \qquad (11b),$$

for example $$(1-\theta_1) \cdot \Delta r_s(t) + \theta_2 \cdot n_{\Delta r}(t) + \theta_3 \cdot b_{\Delta r}(t) = J \cdot \Delta q_s(t)$$

with the normal and the bi-normal vector $n_{\Delta r}(t)$, $b_{\Delta r}(t)$ to the reference motion or with other vectors, wherein the deviation may be predetermined for example by the parameters $\theta$ and/or by choosing the vectors.

Additionally or alternatively it is also possible that a reference velocity for the time increment can differ from the reference motion velocity in a predetermined way, if the drive forces, which are necessary to realize the reference motion exceed tolerable drive forces, for example by enlarging the time increment, by reducing the reference motion and/or by reducing a path velocity $$\frac{ds(t)}{dt}.$$

Preferably the reference increments may by determined by an optimization.

Therein for example as optimization criteria a deviation $$\Psi_1 = (1-\theta) \cdot \Delta r_s(t) - J[q(t)] \cdot \Delta q_s(t) \qquad (12.1a)$$

or $$\Psi_1 = (1-\theta_1) \cdot \Delta r_s(t) + \theta_2 \cdot n_{\Delta r}(t) + \theta_3 \cdot b_{\Delta r}(t) - J[q(t)] \cdot \Delta q_s(t) \qquad (12.1b)$$

between the reference motion and reference increments in a predetermined way, a reserve $$\Psi_2 = M \cdot \frac{d^2 q(t)}{dt^2} + h\left(q(t), \frac{dq(t)}{dt}\right) - \tau_{zul} \qquad (12.2)$$

between tolerable drive forces and the drive forces which—in particular according to the (linearized) model—are required to realize the reference motion, a reserve $$\Psi_3 = \left| J \cdot \frac{\Delta q_s(t)}{\Delta t} \right| - v_{zul} \qquad (12.3)$$

between reference velocity for the time increment and a tolerable Cartesian velocity, a deviation $$\Psi_4 = \frac{\Delta q_s(t)}{\Delta t} - \frac{dq}{dt_s} \qquad (12.4)$$

between reference velocity for the time increment and reference joint velocity, a Reserve $$\Psi_5 = q_s - q_{singular} \qquad (12.5)$$

between poses which are reached by realizing the reference increments and singular poses, drive forces required to realize the reference motion $$\Psi_6 = M \cdot \frac{d^2 q(t)}{dt^2} + h\left(q(t), \frac{dq(t)}{dt}\right) = \tau \qquad (12.6)$$

a distance between poses which are reached by realizing the reference increments and preferred poses $$\Psi_7 = J \cdot q_s - r_{bevorzugt} \qquad (12.7)$$

and/or other terms may be optimized.

In this way for example the reference motion resulting from the interpolation or evaluation of the stored reference path can be shortened by determining an optimal scaling factor $\theta$ such that the necessary drive forces $\tau$ yielding form the dynamics of the manipulator taken into account, are within the tolerable range. The single optimization criteria can for example be evaluated as an absolute norm $$\|\Psi_i\| \quad (13.1),$$

a minimal, maximal or mean norm $$\Psi_i = [\Psi_{1,i}, \Psi_{2,i}, \ldots \Psi_{n,i}] \Rightarrow \begin{cases} \text{Min}\{\Psi_{1,i}, \Psi_{2,i}, \ldots \Psi_{n,i}\} \\ \text{Max}\{\Psi_{1,i}, \Psi_{2,i}, \ldots \Psi_{n,i}\} \\ \dfrac{\Psi_{1,i} + \Psi_{2,i} + \ldots \Psi_{n,i}}{n} \end{cases}, \quad (13.2)$$

or the like. Therein different optimization criteria, in particular competing criteria, can be taken into account by penalty functions or equality or inequality constraint and preferably can be evaluated in a multi-criteria optimization which optimizes different optimization criteria at the same time, for example in a Pareto optimization, a weighted sum of the optimization criteria or the like.

Depending on the chosen optimization criteria, in particular depending on the weighting of the deviation from the predetermined path, the reserve between drive forces which are necessary for realization and the maximum drive forces which are still tolerable, and the velocities occurring therewith, then the reference increments $\Delta q_s(t)$ are determined such that the manipulator fully utilizes its maximum tolerable drive forces and velocities and, if this is not sufficient for realizing the reference increments $\Delta r_s(t)$, deviates in a defined direction therefrom in a controlled way and/or reduces its velocity.

If the optimization does not find a tolerable solution, for example since the reference motion must be shorted too much in order not to exceed the tolerable drive forces, a respective message can be issued and/or following of the path can be stopped.

Using the optimization also is advantageous if the manipulator is redundant, in particular if it reaches singular positions. This is because by evaluating the optimization criterion (12.1) it is also possible to find at least one set of joint coordinates for each singular position. In this respect a manipulator is redundant with respect to a section of a stored reference path if in said section the manipulator has more degrees of freedom then are necessary for realizing a reference position in the Cartesian work space. For example a manipulator with seven or more degrees of freedom is always redundant since a reference position in the Cartesian work space is already well-defined by predetermining three coordinates for the location and three coordinates for the orientation. If on the other hand less then three coordinates for the location and three coordinates for the orientation are necessary for the description, for example since the orientation relative to an axis is not predetermined, then also a manipulator with fewer degrees of freedom is redundant with respect to this reference positions.

The above object also is achieved in accordance with the present invention by a control device for a manipulator, such as a robotic manipulator, that is configured to implement the method described above, and all embodiments thereof.

The above object also is achieved in accordance with the present invention by a computer-readable medium encoded with programming instructions that, when loaded into a processor that controls a manipulator, such as a robotic manipulator, cause the processor to execute a method as described above, as well as all embodiments thereof.

DESCRIPTION OF THE PREFERRED EMBODIMENTS

Figure 1:
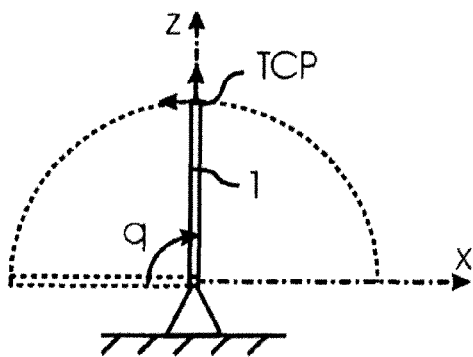
FIG. 1 shows a robot with one joint and a control device according to one embodiment of the present invention.

FIG. 1 shows as a very simple example a robot 1 with one single rotational joint, which shall follow a half circle in the x-z-plane of the reference system depicted in FIG. 1 as a reference path within a time period T.

Figure 2:
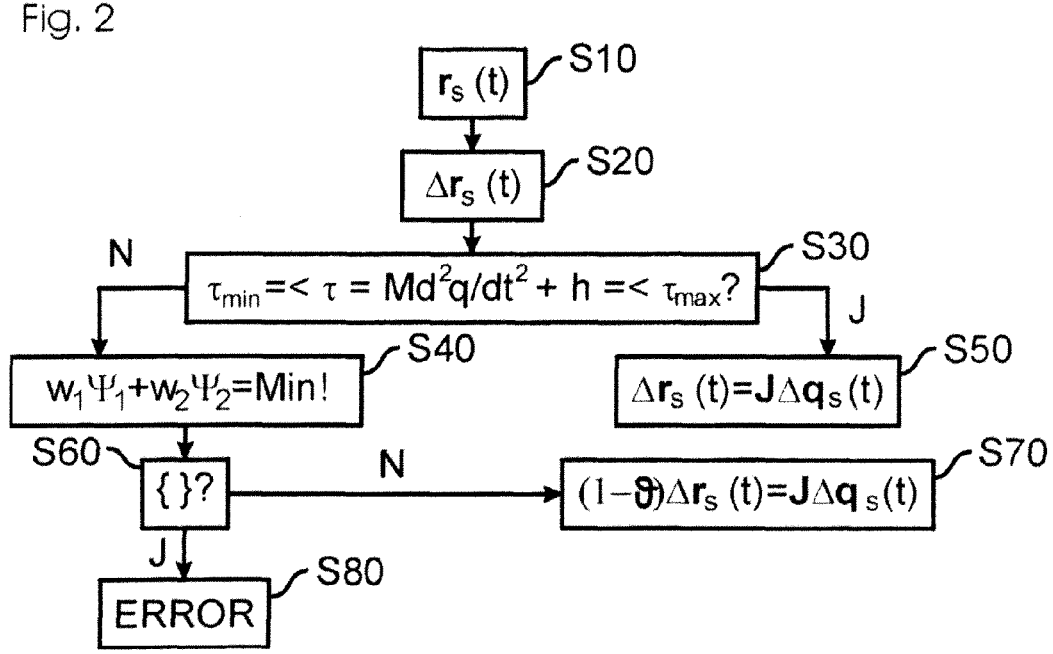
FIG. 2 shows a control method according to one embodiment of the present invention

To this purpose in step S10 (cf. FIG. 2) at first the reference path is stored as parameterized functions with respect to time t:

$$r_s(t) = \begin{bmatrix} -\cos\left(\dfrac{\pi \cdot t}{T}\right) \\ 0 \\ \sin\left(\dfrac{\pi \cdot t}{T}\right) \\ 0 \\ \pi \cdot \left(1 - \dfrac{t}{T}\right) \\ 0 \end{bmatrix}, \quad (2')$$

wherein the reference position $r_s(t)$ denotes the location of the TCP with respect to the origin of the reference system in the work space in Cartesian coordinates (x, y, z) and its orientation with respect to the reference system in KARDAN angles ($\alpha$, $\beta$, $\gamma$) (cf. (3)).

While following the path at the point of time t=0.5 T depicted in FIG. 1 with vertically orientated arm an interpolating device online determines the reference increment $\Delta q$ of the joint angle q with respect to the y axis by which the actual position of the manipulator is to be changed in a time increment $\Delta t$ in order to follow the reference path. For this purpose the interpolating device firstly determines in a step S20 (cf. FIG. 2) for the time increment $$\Delta t = \dfrac{T}{4}$$

a reference motion $\Delta r_s(t)$:

$$\Delta r_s\left(\dfrac{T}{2}\right) = \begin{bmatrix} \dfrac{1}{\sqrt{2}} \\ 0 \\ \dfrac{1}{\sqrt{2}} \\ 0 \\ -\dfrac{\pi}{4} \\ 0 \end{bmatrix} - \begin{bmatrix} 0 \\ 0 \\ 1 \\ 0 \\ -\dfrac{\pi}{2} \\ 0 \end{bmatrix} = \begin{bmatrix} \dfrac{1}{\sqrt{2}} \\ 0 \\ \dfrac{1-\sqrt{2}}{\sqrt{2}} \\ 0 \\ \dfrac{\pi}{4} \\ 0 \end{bmatrix} \quad (6')$$

by evaluating the stored function. In step S25 (not shown) therefrom a provisional axis angle update $$\Delta \tilde{q}_s\left(\dfrac{T}{2}\right) = \dfrac{\pi}{4}$$

is determined according to equation (7) by, for example, only taking into account orientation.

According to the invention, the real or actual reference increment $$\Delta q_s\left(\frac{T}{2}\right)$$

is determined on basis of the dynamics of the manipulator while following the path. Said dynamics may be modelled by the equation of motion $$\underbrace{\frac{ml^2}{M} \cdot \frac{d^2q}{dt^2} + \underbrace{m \cdot l \cdot g \cdot \cos(q)}_{h\left(q,\frac{dq}{dt}\right)} = \tau} \quad (8')$$

with the mass m=1 kg of the arm concentrated in the TCP, the arm length l=1 m, the gravity constant g and the drive torque τ acting in the joint.

By linearizing the equation of motion and the time derivatives according (9.1) to (9.3) then in step S30 it can be determined by evaluating the model (8') of the manipulator whether the drive torque τ which is necessary to realize the provisional axis angle update $$\Delta \tilde{q}_s\left(\frac{T}{2}\right)$$

exceed tolerable drive limits:

$$\tau_{min} \leq \tau = m \cdot \left[\frac{\Delta \tilde{q}_s\left(\frac{T}{2}\right)}{\Delta t^2} - \frac{\left.\frac{dq}{dt}\right|_{\frac{T}{2}}}{\Delta t}\right] \leq \tau_{max} \quad (10')$$

with the joint velocity $$\left.\frac{dq}{dt}\right|_{\frac{T}{2}}$$

at the point of time 0.5 T which for example may be measured. If the drive torque which is necessary to realize the provisional axis angle update is within the tolerable range [$\tau_{min}$, $\tau_{max}$] of tolerable drive limits ("J" in S30), it can be determined directly as real or actual reference increment $$\Delta q_s\left(\frac{T}{2}\right):$$

$$\Delta q_s\left(\frac{T}{2}\right) \leftarrow \Delta \tilde{q}_s\left(\frac{T}{2}\right) \quad (S50)$$

If however the drive torque which is necessary to realize the provisional axis angle update exceeds tolerable drive limits ("N" in S30), then the reference increment is determined such that it differs from the reference motion in a predetermined way predetermined by equation (11) or (11a, b), so that the reference motion yielding from evaluating the stored reference path is shortened until the necessary drive torque τ is within the tolerable range.

For this purpose, in step S40 the parameter θ and the reference increment $$\Delta q_s\left(\frac{T}{2}\right)$$

are determined such that the sum, weighted with w, of the absolute value of the deviation $$\Psi_1 = (1-\theta) \cdot \Delta r_s(t) - J[q(t)] \cdot \Delta q_s(t) \quad (12.1a')$$

or $$\Psi_1 = (1-\theta_1) \cdot \Delta r_s(t) + \theta_2 \cdot n_{\Delta r}(t) + \theta_3 \cdot b_{\Delta r}(t) - J[q(t)] \cdot \Delta q_s(t) \quad (12.1b')$$

between reference motion and reference increments and of the negative value of the reserve $$\Psi_2 = m \cdot \left[\frac{\Delta q_s\left(\frac{T}{2}\right)}{\Delta t^2} - \frac{\left.\frac{dq}{dt}\right|_{\frac{T}{2}}}{\Delta t}\right] - \tau_{zul} \quad (12.2')$$

between tolerable and necessary drive torque, i.e. die optimization criterion $$w_1 \cdot |\Psi_1| - w_2 \cdot \Psi_2, \; w_1, w_2 \geq 0$$

becomes a minimum. Of course equations (12.1'), (12.2') can also be taken into account by penalty functions or equality or inequality constraints. In this respect the mapping $(1-\theta_1) \cdot \Delta r_s(t) + \theta_2 \cdot n_{\Delta r}(t) + \theta_3 \cdot b_{\Delta r}(t)$ with the normal and the bi-normal vector $n_{\Delta r}(t)$, $b_{\Delta r}(t)$ defines a deviation of the reference increments relative to the reference motion in a tube enclosing the reference motion $\Delta r_s$ defined by upper limits for $\theta_2$, $\theta_3$.

Thus the optimization shortens, according to the weighting w, the reference increment with the scaling factor(s) θ until, with the smallest necessary deviation relative to the reference motion, a sufficient reserve of the drive torque is achieved, which may also be equal to zero so that the available drive torque is fully utilized (S70). This reference increment is transferred to a PID joint control which moves the robot 1 accordingly.

In a modification not shown alternatively the optimization reduces the velocity until a sufficient reserve of the drive torque is reached.

If the optimization does not find any admissible solution (S60: "J"), a corresponding message is issued and following of the path is stopped (S80).

In another modification not shown step S30 may be omitted. This is because if the necessary reserve of the drive torque is kept also with the full reference motion, then the optimization determines, with a respective weighting in step S40 with θ=0, the provisional axis angle update as the reference increment $$\Delta q_s\left(\frac{T}{2}\right).$$

The pre-check in step 30 still is advantageous since on the one hand the provisional axis angle update is determined more effectively and on the other hand it can be made sure in an easy way that the control does not shorten the reference motion unnecessarily with respect to a reserve of the drive torque which is unnecessarily large.

We claim as our invention:

1. A method for controlling a robotic manipulator, comprising the steps of:
storing a reference path($r_s[s(t)]$);
determining reference increments ($\Delta q_s[s(t)]$) while following the path;
providing a processor with a model of dynamics of said manipulator represented as a mathematical relation between positions of said manipulator, time derivatives of said positions, and device forces of said manipulator $$M \cdot \frac{d^2 q(t)}{dt^2} + h\left(q(t), \frac{dq(t)}{dt}\right) = \tau;$$

and
in said processor, automatically determining the reference increments based on said dynamics of the manipulator, represented in said model, while following the reference path, by determining a reference motion [$\Delta r_s(t)$] in said processor while following said path for a time increment ($\Delta t$), by interpolation between stored positions or joint coordinates or by evaluating a stored function, and
when drive forces that are necessary to realize a reference motion [$\Delta r_s(t)$] exceed tolerable drive forces ($\tau_{zul}$), automatically determining said reference increments [$\Delta q_s(s(t))$] so as to differ from the reference motion [$\Delta r_s(t)$] by a linear mapping $\Delta q_s(t) = \Phi(\Delta r_s(t))$ of the reference motion, wherein the linear mapping maps the reference increments within a predetermined tube (($1-\theta_1$)·$\Delta r_s + \theta_2 \cdot n_{\Delta r} + \theta_3 \cdot b_{\Delta r}$) enclosing the reference motion [$\Delta r_s(t)$] ($\tau_{zul}$); and
emitting a control signal at an output of the processor that controls movement of said manipulator with respect to said path;
wherein
M is a mass matrix;
q(t) is a vector of reference positions in joint coordinates;
h is a vector embodying weight, gyroscopic, and frictional forces;
$\tau$ is a vector of drive forces,
($\theta_1, \theta_2, \theta_3$) are parameters for deviations from the reference motion; and
$n_{\Delta r}$, $b_{\Delta r}$ are normal and bi-normal vectors to the reference motion.

2. A method according to claim 1, further comprising generating the stored reference path ($r_s$) to include at least one of positions ($r_{s, i}$), representing locations ([$x_i, y_i, z_i$]) and/or orientations ([$\alpha_i, \beta_i, \gamma_i$]), of a manipulator-fixed reference coordinate system (TCP), joint coordinates ([$q_{1, i}, \ldots q_{a, i}$]) and a parameterized function $$\left(r_s[s(t)] = \sum_{i=0} a_i \cdot t^i\right).$$

3. A method according to claim 1, further comprising determining the reference increments [$\Delta q_s(s(t))$] in said processor based on a scaled reference motion ($\Delta r_s(t)$)(($1-\theta$)·$\Delta r_s(t) = J \cdot \Delta q_s(t)$); wherein
J is a Jacobian matrix; and
$\theta$ is a reduction factor.

4. A method according to claim 1, further comprising determine said reference increments[$\Delta q_s(s(t))$] in said processor so as to differ from the reference motion[$\Delta r_s(t)$] when said drive forces that are necessary to realize the reference motion exceed tolerable velocities ($v_{zul}$).

5. A method according to claim 4, further comprising determining a reference velocity $$\left(\frac{\Delta q_s(t)}{\Delta t}\right)$$

for the time increment ($\Delta t$) so as to differ from a reference motion velocity $$\left(\frac{dq}{dt_s}\right)$$

when velocities that are necessary to realize the reference motion exceed said tolerable velocities ($v_{zul}$).

6. A method according to claim 1, further comprising determining the reference increments in said processor by an optimization.

7. A method according to claim 6 further comprising, in said optimization, employing an optimization criterion representing a deviation (($1-\theta$)·$\Delta r_s(t) - J[q(t)] \cdot \Delta q_s(t)$) between the reference motion and the reference increments, a reserve $$\left(M \cdot \frac{d^2 q(t)}{dt^2} + h\left(q(t), \frac{dq(t)}{dt}\right) - \tau_{zul}\right)$$

between drive forces which are necessary to realize the reference motion and tolerable drive forces, a reserve $$\left(\left|J \cdot \frac{\Delta q_s(t)}{\Delta t}\right| - v_{zul}\right)$$

between a reference velocity for the time increment and a tolerable velocity, a deviation $$\left(\frac{\Delta q_s(t)}{\Delta t} - \frac{dq}{dt_s}\right)$$

between reference velocity for the time increment and reference joint velocity, a reserve between a pose which is reached by realizing the reference increments and a singular pose, drive forces which are necessary to realize the reference motion and/or a distance between a pose which is reached by realizing the reference increments and a preferred pose.

8. A method according to claim 6, further comprising employing, in said optimization, criteria selected from the group consisting of penalty functions, equality constraints, and inequality constraints.

9. A method according to claim 4, further comprising redundantly configuring the manipulator with respect to at least in one section of the stored reference path.

10. A control device for a robotic manipulator comprising:
a memory in which a reference path ($r_s[s(t)]$) and a linearized mode $$\left[M \cdot \frac{d^2 q(t)}{dt^2} + h\left(q(t), \frac{dq(t)}{dt}\right) = \tau\right]$$

of dynamics of the manipulator are stored;
a processor being configured to access the reference path and the model in said memory;
said processor being configured to automatically determine reference increments ($\Delta q_s[s(t)]$) (($1-\theta_1$)·$\Delta r_s + \theta_2 \cdot n_{\Delta r} + \theta_3 \cdot b_{\Delta r}$) ($\Delta r_s(t)$; based on said dynamics of the manipulator, represented in said model, while following the reference path, and when drive forces that are necessary to realize a reference motion [$\Delta r_s(t)$] exceed tolerable drive forces($\tau_{zul}$), automatically determine the reference increments [$\Delta q_s(s(t))$] so as to differ from the reference motion [$\Delta r_s(t)$] by a linear mapping $\Delta q_s(t) = \Phi(\Delta r_s(t))$ of the reference motion, wherein the linear mapping maps the reference increments within a predetermined tube (($1-\theta_1$)·$\Delta r_s$ + $\theta_2 \cdot n_{\Delta r} + \theta_3 \cdot b_{\Delta r}$) enclosing the reference motion [$\Delta r_s(t)$] ($\Delta r_s(t)$; ($\Delta q_s(t) = \Phi(\Delta r_s(t))$) ($\tau_{zul}$); and said processor being configured to emit a control signal at an output of the processor that controls movement of said manipulator with respect to said path;

wherein

M is a mass matrix;

q(t) is a vector of reference positions in joint coordinates;

h is a vector embodying weight, gyroscopic, and frictional forces;

$\tau$ is a vector of drive forces, ($\theta_1, \theta_2, \theta_3$) are parameters for deviations from the reference motion; and $n_{\Delta r}, b_{\Delta r}$ are normal and bi-normal vectors to the reference motion.

11. A non-transitory, computer-readable data storage medium encoded with programming instructions, said medium being loadable into a processor that controls a robotic manipulator, said processor having access to a memory in which a reference path for movement of said manipulator is stored, and said programming instructions causing said processor to:

access a linearized mode $$\left[ M \cdot \frac{d^2 q(t)}{dt^2} + h\left(q(t), \frac{dq(t)}{dt}\right) = \tau \right]$$

of dynamics of said manipulator represented as a mathematical relation between positions of said manipulator, time derivatives of said positions, and device forces of said manipulator; and automatically determine reference increments ($\Delta q_s[s(t)]$) (($1-\theta_1$)·$\Delta r_s + \theta_2 \cdot n_{\Delta r} + \theta_3 \cdot b_{\Delta r}$) $\Delta r_s(t)$ based on said dynamics of the manipulator, represented in said model, while following the reference path, by determining a reference motion [$\Delta r_s(t)$] in said processor while following said path for a time increment ($\Delta t$), by interpolation between stored positions or joint coordinates or by evaluating a stored function, and when drive forces that are necessary to realize a reference motion [$\Delta r_s(t)$] exceed tolerable drive forces($\tau_{zul}$), automatically determine said reference increments [$\Delta q_s(s(t))$] so as to differ from the reference motion [$\Delta r_s(t)$] by a linear mapping $\Delta q_s(t) = \Phi(\Delta r_s(t))$ of the reference motion, wherein the linear mapping maps the reference increments within a predetermined tube (($1-\theta_1$)·$\Delta r_s + \theta_2 \cdot n_{\Delta r} + \theta_3 \cdot b_{\Delta r}$) enclosing the reference motion [$\Delta r_s(t)$] ($\tau_{zul}$); and emit a control signal at an output of the processor that controls movement of said manipulator with respect to said path;

wherein

M is a mass matrix;

q(t) is a vector of reference positions in joint coordinates;

h is a vector embodying weight, gyroscopic, and frictional forces;

$\tau$ is a vector of drive forces, ($\theta_1, \theta_2, \theta_3$) are parameters for deviations from the reference motion; and $n_{\Delta r}, b_{\Delta r}$ are normal and bi-normal vectors to the reference motion.

12. A method as claimed in claim 6, further comprising determining the reference increments in said processor by a multi-criteria optimization.

* * * * *